(12) United States Patent
Chang

(10) Patent No.: US 6,656,053 B2
(45) Date of Patent: Dec. 2, 2003

(54) AUTOMATICALLY RESTORABLE UNIVERSAL CONNECTOR

(76) Inventor: Chuck Chang, No. 176-3, Guangming Rd., Taichung (TW)

(*) Notice: Subject to any disclaimer, the term of this patent is extended or adjusted under 35 U.S.C. 154(b) by 18 days.

(21) Appl. No.: 10/023,655

(22) Filed: Dec. 21, 2001

(65) Prior Publication Data

US 2002/0151368 A1 Oct. 17, 2002

(30) Foreign Application Priority Data

Apr. 13, 2001 (TW) ............................ 90205977 U

(51) Int. Cl.[7] ................................................ F16D 3/38
(52) U.S. Cl. ................................... 464/119; 403/146
(58) Field of Search ........................... 464/114, 119, 464/136; 81/177.75; 403/146

(56) References Cited

U.S. PATENT DOCUMENTS

| | | | | |
|---|---|---|---|---|
| 2,196,297 A | * | 4/1940 | Gagne | .................. 464/119 |
| 2,344,808 A | * | 3/1944 | Duffield et al. | .............. 403/146 |
| 2,636,759 A | * | 4/1953 | Rueb | ..................... 464/119 X |
| 5,421,780 A | * | 6/1995 | Vukovic | |
| 5,433,548 A | * | 7/1995 | Roberts et al. | ...... 81/177.75 X |
| 5,458,028 A | * | 10/1995 | Cleveland, III | ......... 464/119 X |
| 5,566,048 A | * | 10/1996 | Esterberg et al. | ....... 403/146 X |
| 6,261,024 B1 | * | 7/2001 | Farber | .................... 403/146 X |

* cited by examiner

Primary Examiner—Greg Binda
(74) Attorney, Agent, or Firm—Rosenberg, Klein & Lee

(57) ABSTRACT

An automatically restorable universal connector includes at least two members pivoted with each other, each of the two members formed with a pivot end which is provided with a locking portion; a pivot shaft extended through the two members; and a restoring member mounted between the two members and having two ends each locked and positioned in the locking portion of each of the two members, so that the two members can be restored automatically, thereby facilitating operation of the universal connector.

2 Claims, 10 Drawing Sheets

AUTOMATICALLY RESTORABLE UNIVERSAL CONNECTOR

BACKGROUND OF THE INVENTION

1. Field of the Invention

The present invention relates to a universal connector, and more particularly to an automatically restorable universal connector, wherein the restoring member may efficiently provide an automatic restoring function to the locking member and the mounting member, thereby greatly facilitating operation of the automatically restorable universal connector.

2. Description of the Related Art

A conventional universal connector in accordance with the prior art shown in FIGS. 9 and 10 comprises a locking member 70, a mounting member 74, a connecting member 72 pivoted between the locking member 70 and the mounting member 74, and a restoring spring 80 mounted on the outside of the locking member 70, the mounting member 74, and the connecting member 72.

However, the restoring spring 80 is mounted on the outside of the locking member 70, the mounting member 74, and the connecting member 72, thereby greatly enlarging the volume of the universal connector. In addition, the user is easily clipped by the restoring spring 80.

SUMMARY OF THE INVENTION

The present invention has arisen to mitigate and/or obviate the disadvantage of the conventional universal connector.

The primary objective of the present invention is to provide an automatically restorable universal connector, wherein the restoring member may efficiently provide an automatic restoring function to the locking member and the mounting member, thereby facilitating operation of the automatically restorable universal connector.

In accordance with the present invention, there is provided an automatically restorable universal connector, comprising:

at least two members pivoted with each other, each of the two members formed with a pivot end which is provided with a locking portion;

a pivot shaft extended through the two members; and a restoring member mounted between the two members and having two ends each locked and positioned in the locking portion of each of the two members, so that the two members can be restored automatically.

Further benefits and advantages of the present invention will become apparent after a careful reading of the detailed description with appropriate reference to the accompanying drawings.

DETAILED DESCRIPTION OF THE INVENTION

Figure 1:
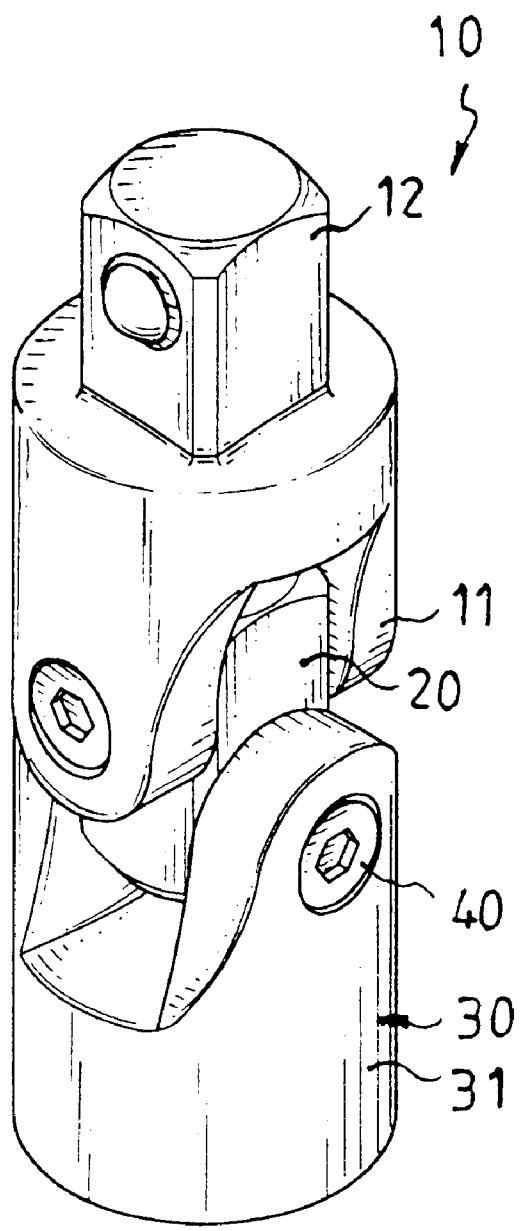
FIG. 1 is a perspective view of an automatically restorable universal connector in accordance with a first embodiment of the present invention.
Figure 2:
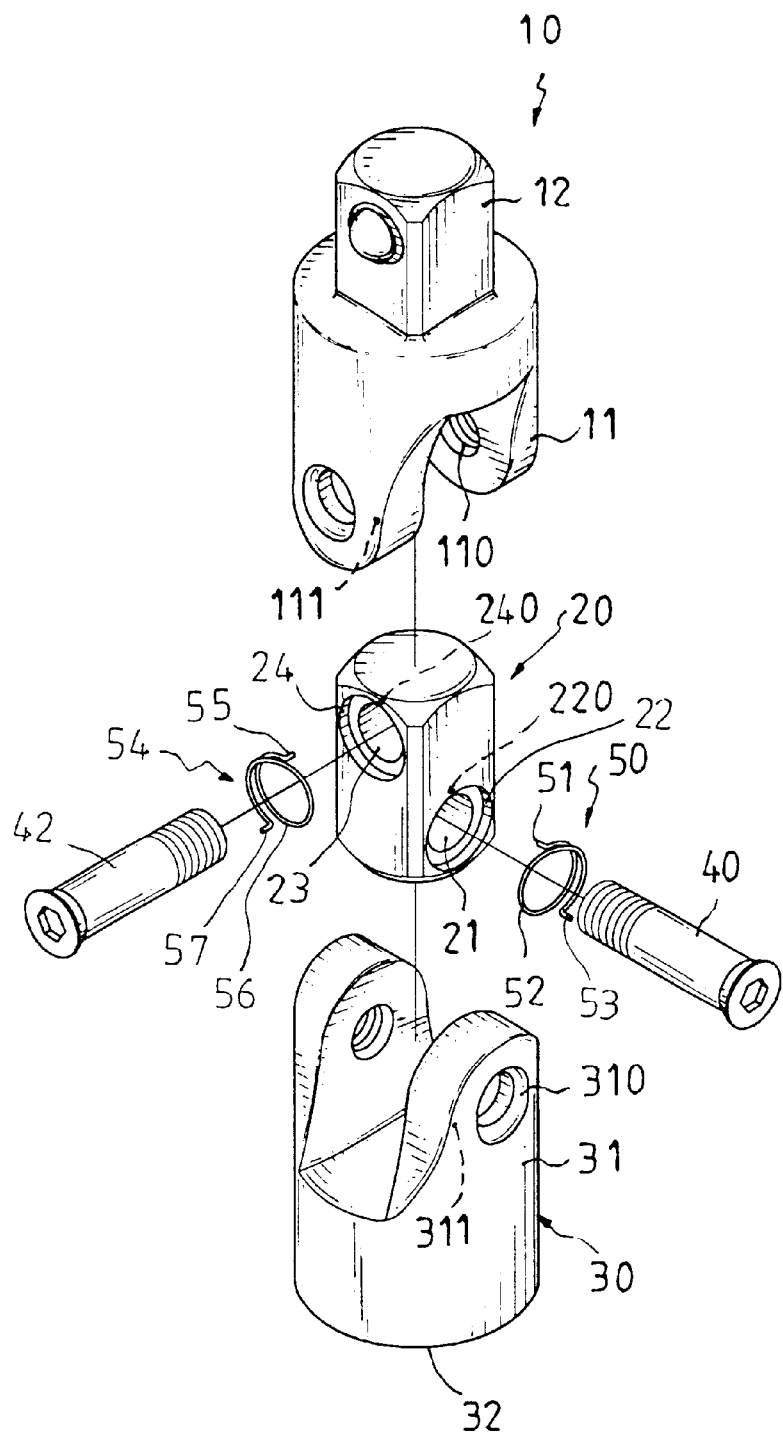
FIG. 2 is an exploded perspective view of the automatically restorable universal connector as shown in FIG. 1.
Figure 3:
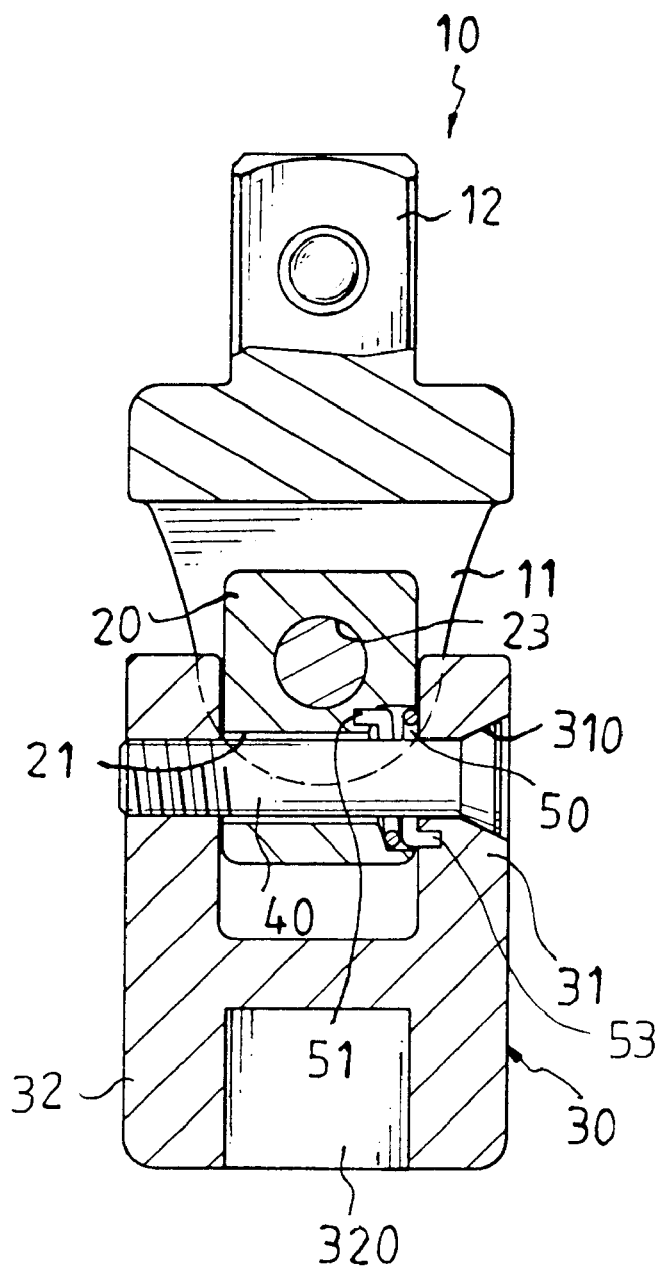
FIG. 3 is a front plan cross-sectional view of the automatically restorable universal connector as shown in FIG. 1.
Figure 4:
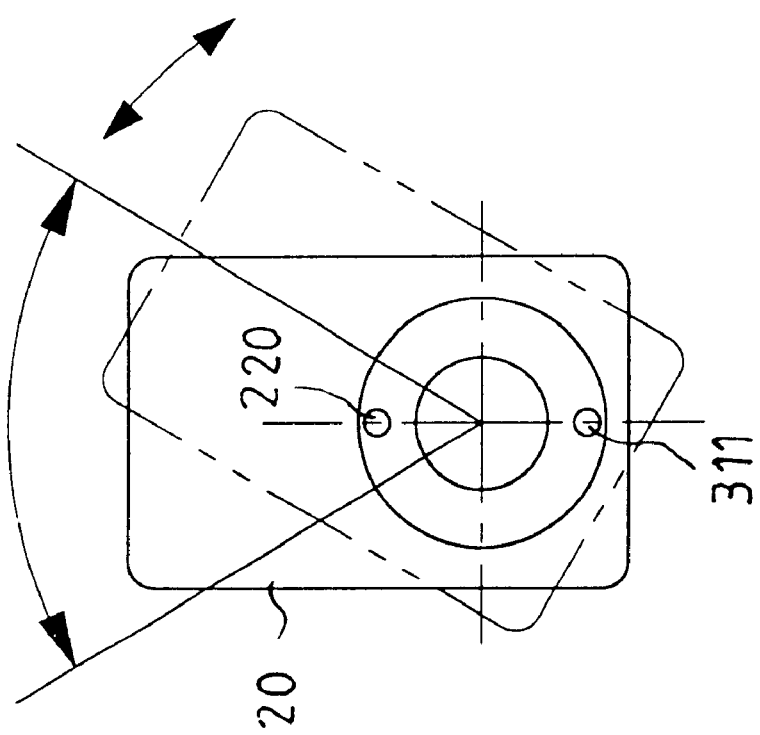
FIG. 4 is a schematic operational view of the automatically restorable universal connector as shown in FIG. 1 in use.
Figure 5:
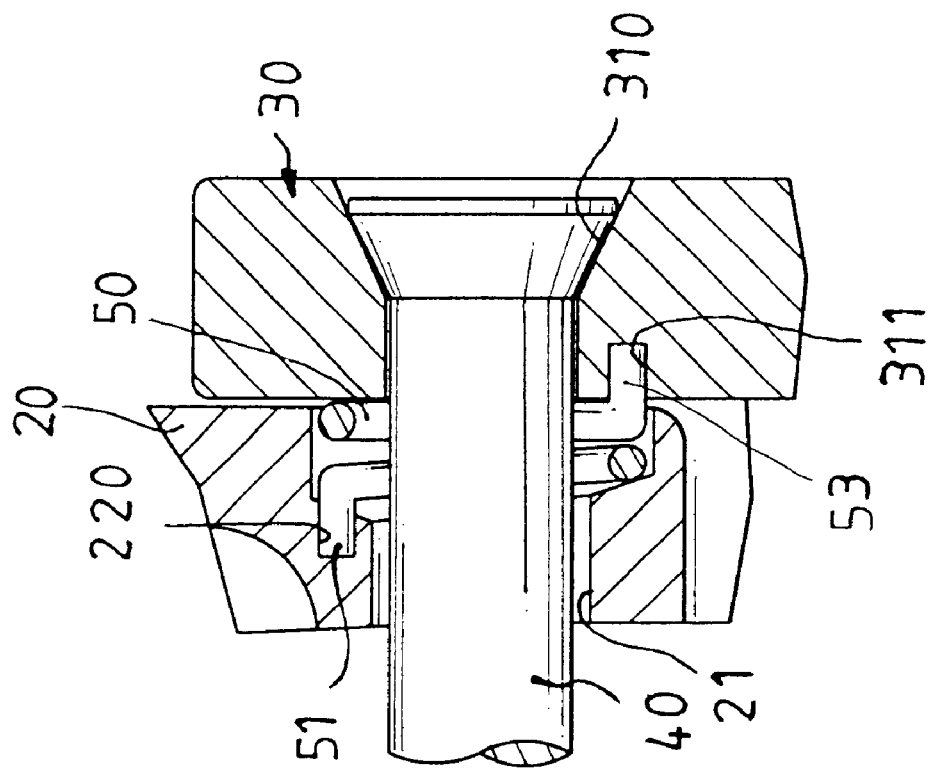
FIG. 5 is a partially enlarged view of the automatically restorable universal connector as shown in FIG. 3.

Referring to the drawings and initially to FIGS. 1–5, an automatically restorable universal connector in accordance with a first embodiment of the present invention comprises a locking member 10, a connecting member 20, and a mounting member 30.

The locking member 10 includes a locking head 12 that may be inserted into a socket (not shown), and a fork-shaped recessed pivot arm 11 defining a shaft hole 110. A locking portion 111 (such as a locking hole) is formed on the surface of the fork-shaped recessed pivot arm 11.

The mounting member 30 includes a mounting head 32 defining a locking recess 320 for insertion of a drive head (not shown) of a tool (not shown) such as a socket wrench, and a fork-shaped recessed pivot arm 31 defining a shaft hole 310. A locking portion 311 (such as a locking hole) is formed on the surface of the fork-shaped recessed pivot arm 31.

The connecting member 20 is pivotally mounted between the locking member 10 and the mounting member 30, and has a first end pivotally mounted on the pivot arm 11 of the locking member 10, and a second end pivotally mounted on the pivot arm 31 of the mounting member 30.

The first end of the connecting member 20 is formed with a shaft hole 23, and a pivot shaft 42 is extended through the shaft hole 110 of the pivot arm 11 of the locking member 10 and the shaft hole 23 of the first end of the connecting member 20, so that the first end of the connecting member 20 is pivoted on the pivot arm 11 of the locking member 10.

The shaft hole 23 of the first end of the connecting member 20 has an opening end formed with a receiving chamber 24 having a diameter greater than that of the shaft hole 23. The receiving chamber 24 has a wall formed with a locking portion 240 (such as a locking hole).

A restoring member 54 (such as a torsion spring) is mounted on the pivot shaft 42, and is received in the receiving chamber 24. The restoring member 54 is formed with a press portion 56 biased between the wall of the receiving chamber 24 and the surface of the pivot arm 11 of the locking member 10. The restoring member 54 has a first end formed with a bent locking end 55 locked in the locking portion 240 of the receiving chamber 24, and a second end formed with a bent locking end 57 locked in the locking portion 111 of the pivot arm 11 of the locking member 10, thereby providing a restoring effect.

The second end of the connecting member 20 is formed with a shaft hole 21 that has an axial direction vertical to that of the shaft hole 23, and a pivot shaft 40 is extended through the shaft hole 310 of the pivot arm 31 of the mounting member 30 and the shaft hole 21 of the second end of the connecting member 20, so that the second end of the connecting member 20 is pivoted on the pivot arm 31 of the mounting member 30.

The shaft hole 21 of the second end of the connecting member 20 has an opening end formed with a receiving chamber 22 having a diameter greater than that of the shaft hole 21. The receiving chamber 22 has a wall formed with a locking portion 220 (such as a locking hole).

A restoring member 50 (such as a torsion spring) is mounted on the pivot shaft 40, and is received in the receiving chamber 22. The restoring member 50 is formed with a press portion 52 biased between the wall of the receiving chamber 22 and the surface of the pivot arm 31 of the mounting member 30. The restoring member 50 has a first end formed with a bent locking end 51 locked in the locking portion 220 of the receiving chamber 22, and a second end formed with a bent locking end 53 locked in the locking portion 311 of the pivot arm 31 of the mounting member 30, thereby providing a restoring effect.

Accordingly, the automatically restorable universal connector of the present invention has the following advantages.

The restoring members 50 and 54 are initially received in the receiving chambers 22 and 24 respectively, and the locking ends 51 and 55 of the restoring members 50 and 54 are locked in the locking portions 220 and 240 of the receiving chambers 22 and 24 respectively. After all of the parts are assembled, the locking member 10 and the mounting member 30 may be rotated slightly, so that the locking ends 53 and 57 of the restoring members 50 and 54 may be locked in the locking portions 311 and 111 of the pivot arms 31 and 11 of the mounting member 30 and the locking member 10 respectively, so that the automatically restorable universal connector may have an automatic restoring function. Thus, the automatically restorable universal connector can be assembled easily.

In addition, the restoring members 50 and 54 may efficiently provide an automatic restoring function to the locking member 10 and the mounting member 30, thereby facilitating operation of the universal connector.

Further, the press portion 52 of the restoring member 50 is biased between the wall of the receiving chamber 22 of the connecting member 20 and the surface of the pivot arm 31 of the mounting member 30, while the press portion 56 of the restoring member 54 is biased between the wall of the receiving chamber 24 of the connecting member 20 and the surface of the pivot arm 11 of the locking member 10, thereby providing a damping effect, so that the locking member 10, the connecting member 20 and the mounting member 30 will not be detached or loosened from each other.

Figure 6:
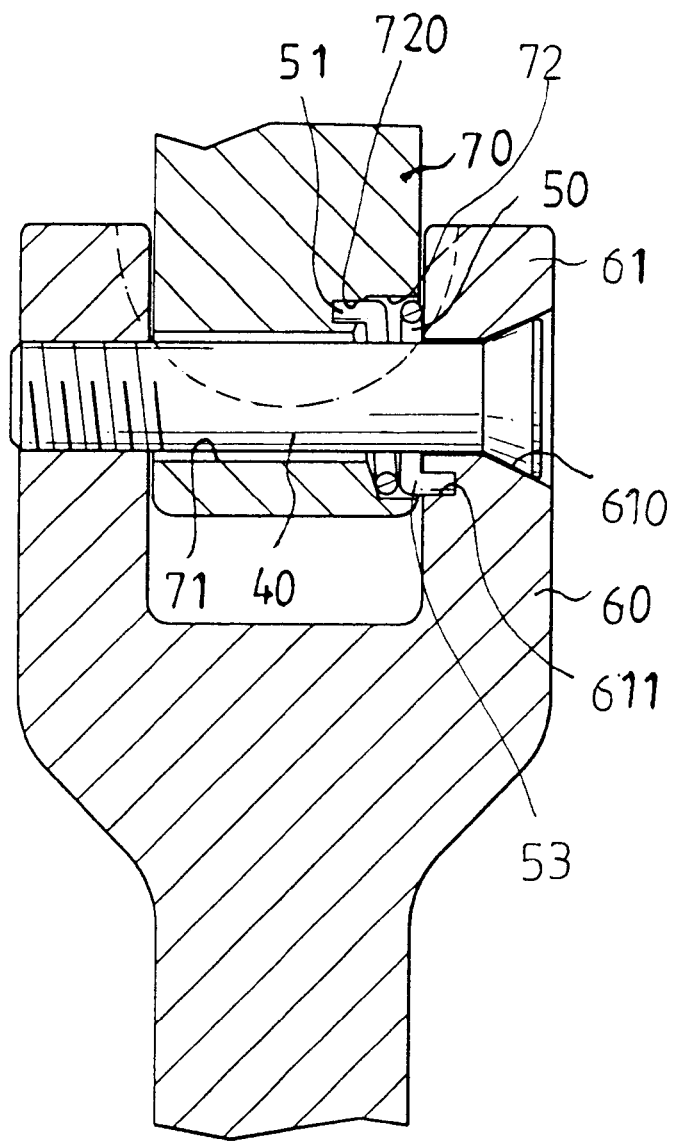
FIG. 6 is a front plan cross-sectional view of an automatically restorable universal connector in accordance with a second embodiment of the present invention.

Referring to FIG. 6, in accordance with a second embodiment of the present invention, the automatically restorable universal connector comprises a wrench 60 pivoted with a connecting head 70 only. The pivot shaft 40 is extended through the shaft hole 610 of the fork-shaped pivot arm 61 of the wrench 60 and the shaft hole 71 of the connecting head 70, so that the connecting head 70 is pivoted on the pivot arm 61 of the wrench 60. The end of the shaft hole 71 is formed with a receiving chamber 72 for receiving the restoring member 50. The receiving chamber 72 is formed with a locking portion 720 for locking the locking end 51 of the restoring member 50, and the pivot arm 61 of the wrench 60 is formed with a locking portion 611 for locking the locking end 53 of the restoring member 50.

Figure 7:
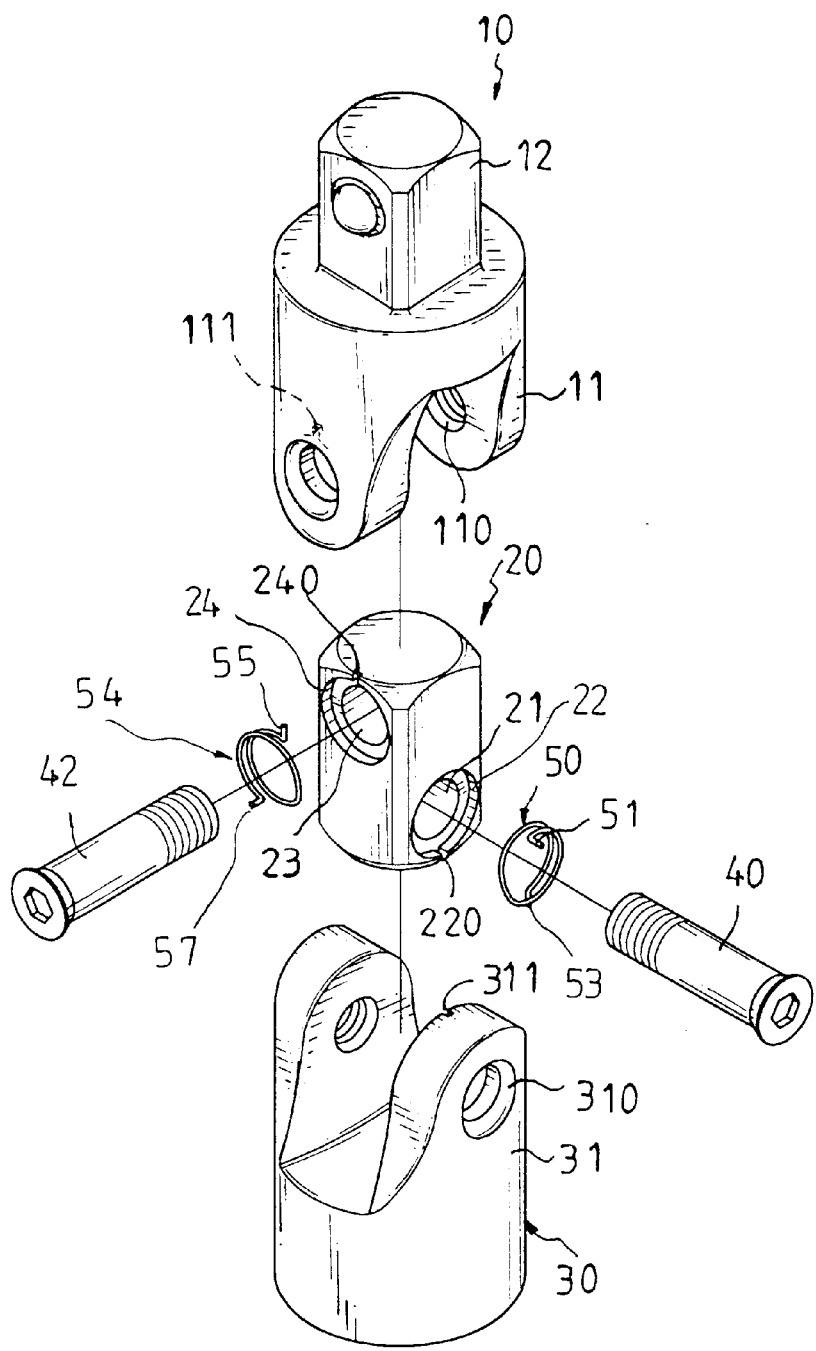
FIG. 7 is an exploded perspective view of an automatically restorable universal connector in accordance with a third embodiment of the present invention.
Figure 8:
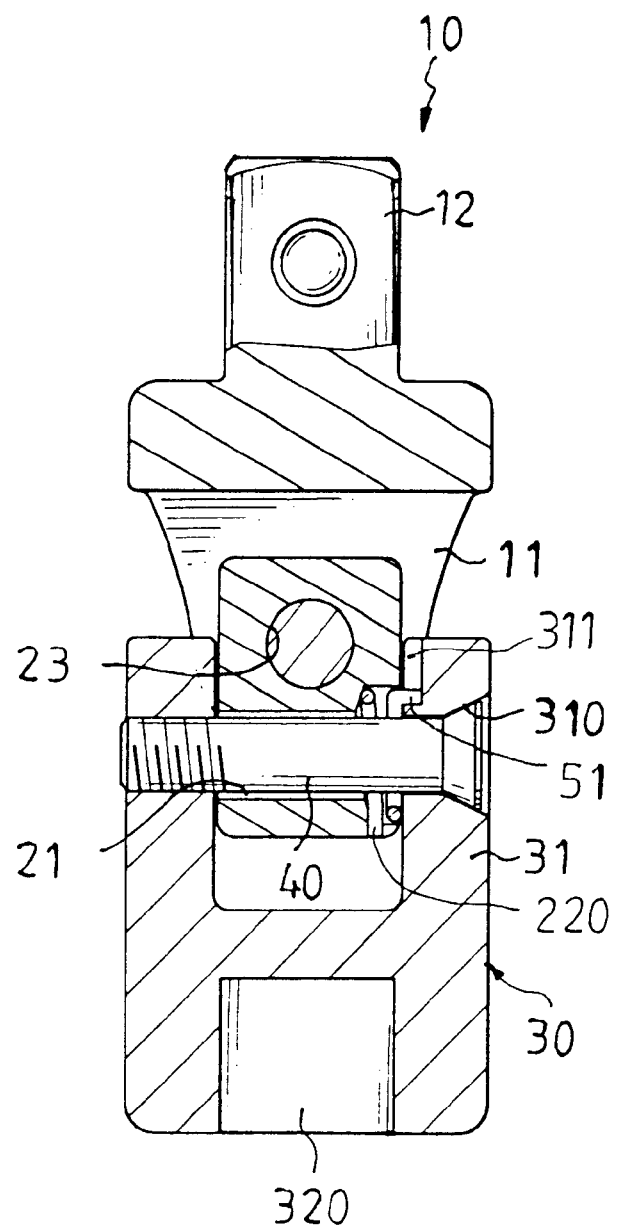
FIG. 8 is a cross-sectional assembly view of the automatically restorable universal connector as shown in FIG. 7.
Figure 9:
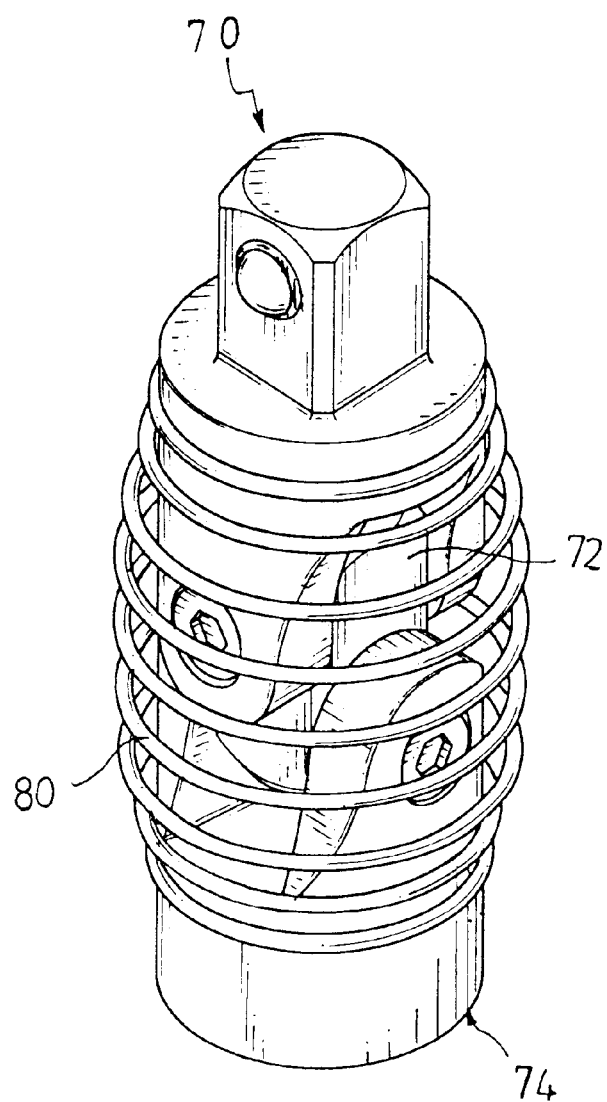
FIG. 9 is a perspective view of a conventional universal connector in accordance with the prior art.
Figure 10:
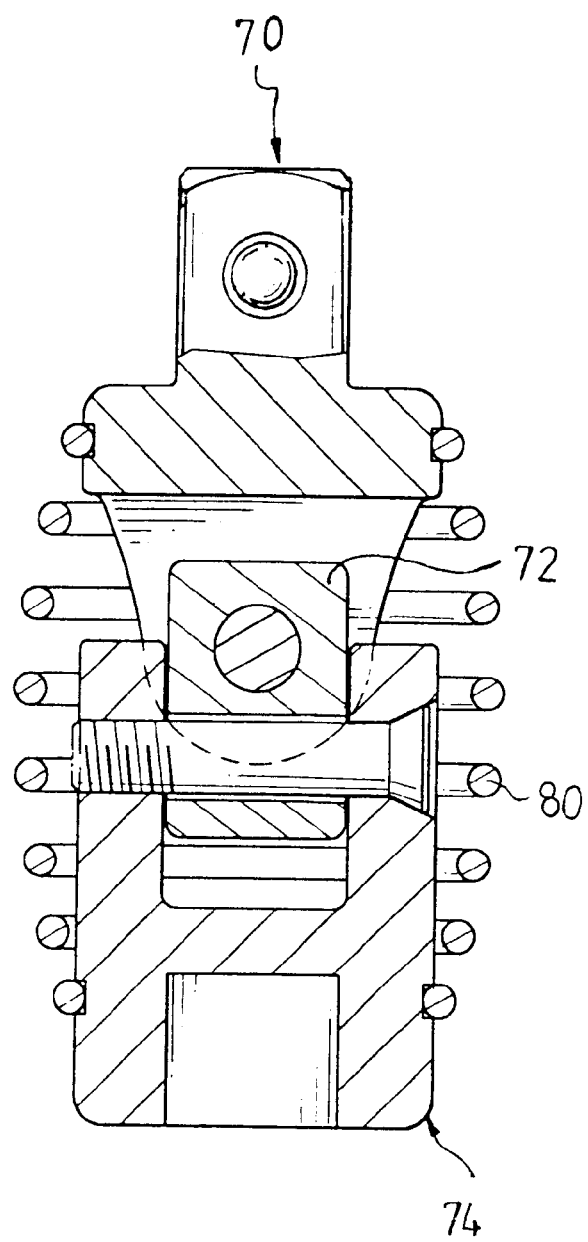
FIG. 10 is a cross-sectional assembly view of the conventional universal connector as shown in FIG. 9.

Referring to FIGS. 7 and 8, in accordance with a third embodiment of the present invention, each of the locking portions 111, 220, 240 and 311 has a slit-shape, thereby facilitating insertion of the locking ends 57, 53, 55 and 51.

Although the invention has been explained in relation to its preferred embodiment as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. An automatically restorable universal connector, comprising:

a connecting member formed with a first shaft hole and a second shaft hole;

the first shaft hole of the connecting member having an end formed with a first receiving chamber having a diameter greater than that of the first shaft hole;

the first receiving chamber of the connecting member having a wall formed with a first locking portion;

the second shaft hole of the connecting member having an end formed with a second receiving chamber having a diameter greater than that of the second shaft hole;

the second receiving chamber of the connecting member having a wall formed with a second locking portion;

a locking member having a fork-shaped recessed pivot arm pivotally mounted on the connecting member;

the pivot arm of the locking member having a shaft hole;

the pivot arm of the locking member having a surface formed with a locking portion;

a first pivot shaft extended through the shaft hole of the pivot arm of the locking member and the first shaft hole of the connecting member;

a first restoring member mounted on the first pivot shaft and having a first bent locking end locked in the first locking portion of the first receiving chamber of the connecting member and a second bent locking end locked in the locking portion of the pivot arm of the locking member;

a mounting member having a fork-shaped recessed pivot arm pivotally mounted on the connecting member;

the pivot arm of the mounting member having a shaft hole;

the pivot arm of the mounting member having a surface formed with a locking portion;

a second pivot shaft extended through the shaft hole of the pivot arm of the mounting member and the second shaft hole of the connecting member; and a second restoring member mounted on the second pivot shaft and having a first bent locking end locked in the second locking portion of the second receiving chamber of the connecting member and a second bent locking end locked in the locking portion of the pivot arm of the mounting member.

2. The automatically restorable universal connector in accordance with claim 1, wherein the first restoring member is formed with a press portion biased between the wall of the first receiving chamber of the connecting member and the surface of the pivot arm of the locking member; and the second restoring member is formed with a press portion biased between the wall of the second receiving chamber of the connecting member and the surface of the pivot arm of the mounting member.

* * * * *